(12) United States Patent
Mo et al.

(10) Patent No.: US 11,828,449 B2
(45) Date of Patent: Nov. 28, 2023

(54) LIGHT RING FOR PLUMBING FIXTURES

(71) Applicant: Sloan Valve Company, Franklin Park, IL (US)

(72) Inventors: Xiaoxiong Mo, Lexington, MA (US);
Kay Herbert, Winthrop, MA (US);
Reeshi Pradhan, Watertown, MA (US);
Haiou Wu, Dedham, MA (US);
Qiaohong Chen, Lexington, MA (US);
Timothy L. Moulton, Newport, RI (US)

(73) Assignee: Sloan Valve Company, Franklin Park, IL (US)

( * ) Notice: Subject to any disclaimer, the term of this patent is extended or adjusted under 35 U.S.C. 154(b) by 0 days.

(21) Appl. No.: 17/377,669

(22) Filed: Jul. 16, 2021

(65) Prior Publication Data

US 2022/0018531 A1 Jan. 20, 2022

Related U.S. Application Data

(60) Provisional application No. 63/053,078, filed on Jul. 17, 2020.

(51) Int. Cl.
*F21V 33/00* (2006.01)
*H05B 47/115* (2020.01)
*A47K 5/12* (2006.01)
*A47K 10/36* (2006.01)
*A47K 10/48* (2006.01)
(Continued)

(52) U.S. Cl.
CPC .......... *F21V 33/004* (2013.01); *A47K 5/1217* (2013.01); *A47K 10/36* (2013.01); *A47K 10/48* (2013.01); *E03C 1/057* (2013.01); *E03D 5/105* (2013.01); *F21S 10/02* (2013.01); *H05B 47/115* (2020.01); *A47K 2010/3668* (2013.01); *F21Y 2115/10* (2016.08)

(58) Field of Classification Search
CPC .... H05B 47/115; A47K 5/1217; A47K 10/36; A47K 10/48; E03C 1/057; E03D 5/105; F21S 10/02
USPC ...................................................... 362/23.08
See application file for complete search history.

(56) References Cited

U.S. PATENT DOCUMENTS 4,894,874 A    1/1990 Wilson
5,187,818 A    2/1993 Barrett, Sr. et al.
(Continued)

FOREIGN PATENT DOCUMENTS

CN    1720377 A    1/2006
CN    101050826 A    10/2007
(Continued)

OTHER PUBLICATIONS

Dec. 10, 2021—(WO) ISR and Written Opinion—App PCT/US2021/041953.

(Continued)

*Primary Examiner* — Bryon T Gyllstrom
(74) *Attorney, Agent, or Firm* — Banner & Witcoff, Ltd.

(57) ABSTRACT

A light ring assembly for a bathroom fixture. The light ring may illuminate one or more light sources in a predetermined sequence and/or in an overlapping manner to create a pulse of light that traverses the circumference of the light ring. Different patterns, colors, and/or sequences of light may be used to convey messages and signals to owners, maintenance, and/or users.

19 Claims, 9 Drawing Sheets

(51) Int. Cl.
  *E03C 1/05* (2006.01)
  *E03D 5/10* (2006.01)
  *F21S 10/02* (2006.01)
  *F21Y 115/10* (2016.01)

(56) References Cited

U.S. PATENT DOCUMENTS

| | | | |
|---|---|---|---|
| 5,224,509 A | 7/1993 | Tanaka et al. | |
| 5,680,879 A | 10/1997 | Sheih et al. | |
| 5,747,940 A * | 5/1998 | Openiano | F21S 4/10 |
| | | | 315/185 S |
| 6,202,980 B1 | 3/2001 | Vincent et al. | |
| 6,212,697 B1 | 4/2001 | Parsons et al. | |
| 7,156,363 B2 | 1/2007 | Parsons et al. | |
| 7,396,000 B2 | 7/2008 | Parsons et al. | |
| 7,464,418 B2 | 12/2008 | Seggio et al. | |
| 7,562,399 B2 | 7/2009 | Parsons et al. | |
| 8,276,878 B2 * | 10/2012 | Parsons | E03D 5/105 |
| | | | 251/129.04 |
| 9,353,511 B2 | 5/2016 | Wilson et al. | |
| 10,151,090 B2 * | 12/2018 | Wilson | E03D 5/10 |
| 10,393,363 B2 * | 8/2019 | Weaver | F21V 7/0066 |
| 10,582,813 B2 | 3/2020 | Carter | |
| 2002/0007510 A1 * | 1/2002 | Mann | E03C 1/057 |
| | | | 4/300 |
| 2005/0047131 A1 * | 3/2005 | Blessing | F21V 27/02 |
| | | | 362/240 |
| 2007/0007304 A1 | 1/2007 | Bitton | |
| 2007/0008726 A1 * | 1/2007 | Brown | H05B 45/20 |
| | | | 362/802 |
| 2007/0157978 A1 * | 7/2007 | Jonte | E03C 1/057 |
| | | | 137/613 |
| 2008/0271238 A1 * | 11/2008 | Reeder | A46B 15/0055 |
| | | | 4/597 |
| 2010/0275359 A1 | 11/2010 | Guler et al. | |
| 2013/0097773 A1 | 4/2013 | Pinkus et al. | |
| 2014/0261767 A1 * | 9/2014 | DeVries | E03C 1/0401 |
| | | | 174/138 R |
| 2015/0102731 A1 * | 4/2015 | Altamura | A47G 33/0836 |
| | | | 315/152 |
| 2015/0183525 A1 * | 7/2015 | De Jager | F21V 7/0091 |
| | | | 340/983 |
| 2016/0201311 A1 | 7/2016 | Guler et al. | |
| 2018/0028027 A1 | 2/2018 | Kendall et al. | |
| 2019/0270630 A1 | 9/2019 | Dahan et al. | |
| 2022/0183132 A1 * | 6/2022 | Kodadek, III | H05B 47/185 |

FOREIGN PATENT DOCUMENTS

| | | |
|---|---|---|
| EP | 2813627 A1 | 12/2014 |
| EP | 2828440 A1 | 1/2015 |
| EP | 3147577 A1 | 3/2017 |
| WO | 2003048464 A2 | 6/2003 |
| WO | 2020072331 A1 | 4/2020 |

OTHER PUBLICATIONS

2012, Trans Tech Publications, Switzerland, PLC Automatic Controlling System of Flushing Toilet.

Jan. 5, 2020, AutoFlush Unit for Urinals & Toilets.

Nov. 2015, IJRBAT, vol. II, Design and Implementation of Automatic Flush System for Sanitation in Public Toilets.

Dec. 23, 2019, Flush Actuator Sensor Panel, Black Colour with Light—Rigel.

* cited by examiner

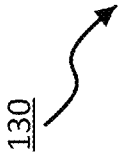
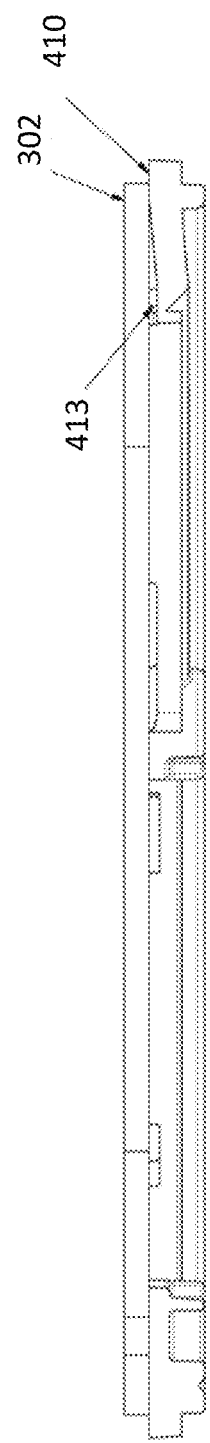

LIGHT RING FOR PLUMBING FIXTURES

CROSS-REFERENCE TO RELATED APPLICATIONS

This application claims priority to U.S. Provisional Application No. 63/053,078, filed on Jul. 17, 2020 and entitled "Flushometer with a Light Ring," the entirety of which is incorporated herein by reference.

FIELD OF THE DISCLOSURE

Aspects of the disclosure generally relate to plumbing fixtures and more specifically to plumbing fixtures with a light ring configured to provide messaging and/or signaling via different colors and/or patterns of light.

BACKGROUND OF THE DISCLOSURE

Sensors are deployed in a plurality of bathroom fixtures to automate their operation. For example, sensors may be used to flush toilets and/or urinals, turn on/off faucets, activate hand dryers, and dispense paper towels. However, these sensors provide no indication acknowledging the presence of the user. Moreover, these sensors do not provide an indication of when the sensor and/or the fixture needs to be serviced and/or maintained.

Aspects described herein may address these and other problems, and generally improve the quality and efficiency with which messaging and/or signaling is provided to users.

BRIEF SUMMARY OF THE DISCLOSURE

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, methods, and computer-readable media are also within the scope of the disclosure.

Example apparatuses and systems disclosed herein describe a light ring assembly for bathroom fixtures. The light ring may be disposed within the fixture and may comprise a plurality of light sources. The plurality of light sources may be illuminated in a predetermined sequence and/or in an overlapping manner to create a pulse of light. The pulse of light may travel in one or more patterns along the circumference of the light ring. The light ring may use a plurality of light patterns, colors, and/or sequences of light to convey messages and/or signals to owners, maintenance, custodial staff, and/or users. This may allow the owners, maintenance, and/or custodial staff to service, or otherwise, maintain the fixture as indicated or "translated" by the light patterns. Moreover, the light ring may provide a better user experience by conveying messages and/or signals to the user about the status of the fixture and the components thereof.

Other aspects, objectives and advantages of the invention will become more apparent from the following detailed description when taken in conjunction with the accompanying drawings.

BRIEF DESCRIPTION OF THE DRAWINGS

The present disclosure is described by way of example and not limited in the accompanying figures in which:

FIG. 4 shows an example of a light ring assembly in accordance with one or more aspects of the disclosure;

DETAILED DESCRIPTION OF THE DISCLOSURE

In the following description of the various example embodiments, reference is made to the accompanying drawings, which form a part hereof, and in which is shown by way of illustration various example embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may describe a light ring for a plumbing fixture, such as a flushometer. The light ring may illuminate one or more light sources in a predetermined sequence and/or in an overlapping manner of intensity and/or color to create a pulse of light that traverses the circumference of the light ring. Different patterns, colors, and/or sequences of light may be used to convey messages and/or signals to owners, maintenance, custodial staff, and/or users.

Example processes, methods, and techniques described herein may include illuminating one or more light sources (e.g., LEDs) in a predetermined, overlapping sequence of intensity and separation to produce a pulse of light or band of light that traverses the circumference in a manner that can appear fluid or blinking. The one or more light sources may be separated by a predetermined distance to produce the pulse of light or band of light. Using different sequences, patterns, and/or colors, the light ring may convey messages and/or signals regarding the plumbing fixture and its various components. The messages and/or signals may allow the plumbing fixture and its various components to be serviced and/or maintained, while providing a user with a better overall user experience.

Figure 1A:
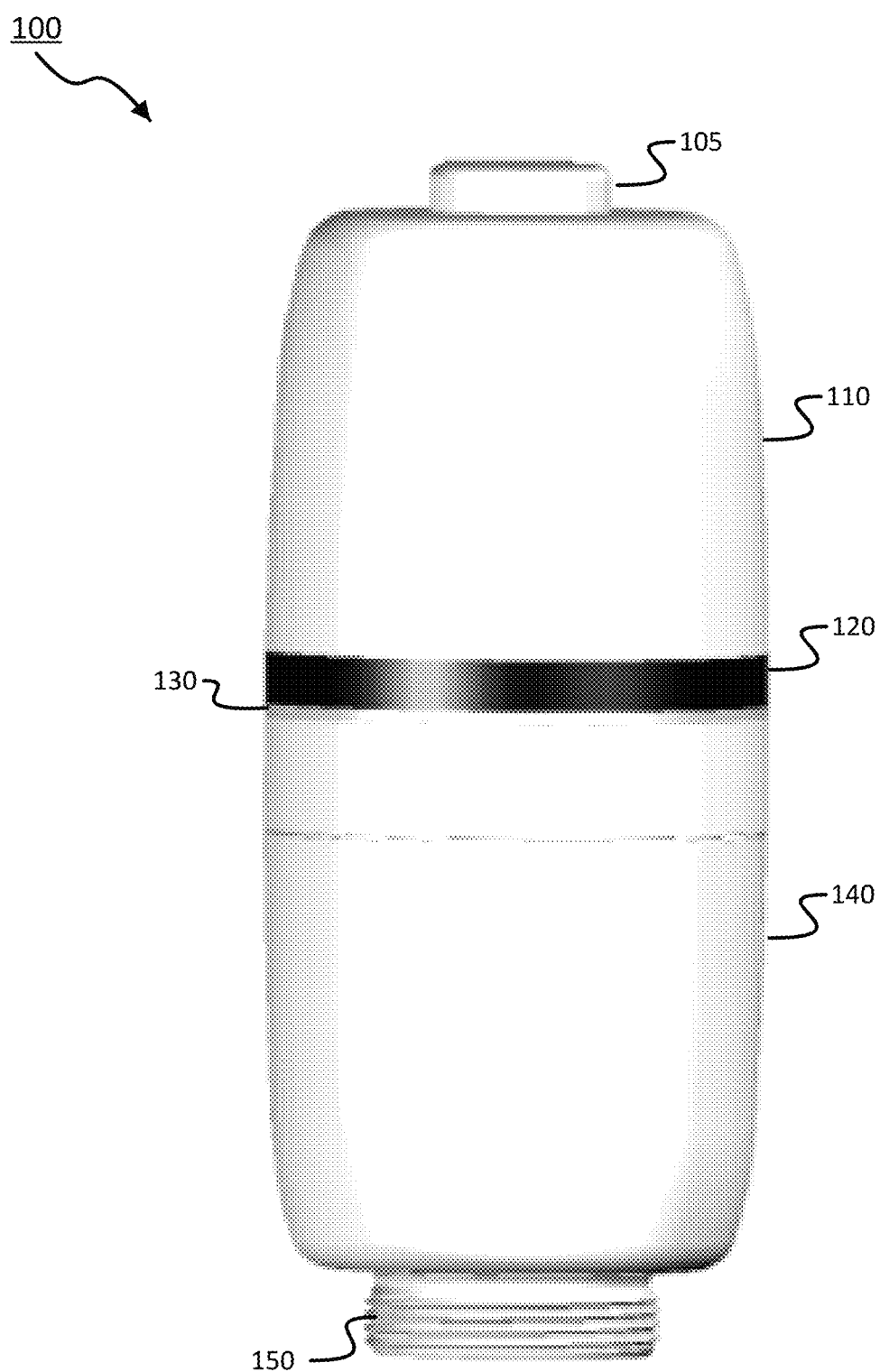
FIGS. 1A and 1B show an example of a flushometer according to one or more aspects of the disclosure.

Turning to FIG. 1A, an example of a flushometer 100 is shown according to one or more aspects of the disclosure. The flushometer 100 may comprise an upper housing 110, a sensor 120, a light ring assembly 130, a lower housing 140, and an outlet connection 150. The upper housing 110 and/or the lower housing 140 may enclose plumbing hardware (e.g., a guide assembly, a diaphragm, a relief valve, a solenoid, etc.) in a water proof or water-resistant housing. The upper housing 110 and the lower housing 140 may interconnect via a number of fasteners. For example, portions of both the upper housing 110 and the lower housing 140 may be threaded such that the upper housing 110 and the lower housing 140 may be screwed together. Alternatively, the upper housing 110 and the lower housing 140 may comprise a series of tabs and slots that allow the upper housing 110 and the lower housing 140 to be snapped together.

The upper housing 110 may include a manual flush button 105 configured to manually operate the flushometer. The sensor 120 may be a battery-operated sensor configured to detect the presence and/or proximate location of a user. Alternatively, the sensor 120 may comprise a hardwired sensor that is wired to a building's power supply. In this regard, the sensor 120 may comprise a battery back-up, for example, in case the building loses power. The sensor 120 may comprise one or more transmitters configured to emit light in the non-visible spectrum at one or more targets and one or more IR detectors (e.g., photodiode, phototransistor, etc.) configured to detect non-visible light reflected off the one or more targets (e.g., users). The non-visible light may have a wavelength between 800 nm and 1000 nm. The sensor 120 may initiate a mechanical operation in response to detecting a user within a predefined range (e.g., detection zone) of the sensor. For example, the mechanical operation may include turning on a faucet; dispensing soap from a soap dispenser; dispensing paper towels from a paper towel dispenser; commencing the flow of hot air from a hand dryer; emitting ultraviolet light to clean, sanitize, and/or disinfect hands; and/or opening a door. Additionally or alternatively, the sensor 120 may initiate the mechanical operation, for example, in response to detecting that the user is no longer within the predefined range of the sensor 120 after a period of time. In this regard, the mechanical operation may include turning off a faucet, turning off a hand dryer, ceasing emitting ultraviolet light, or flushing a toilet and/or urinal. While the sensor 120 is shown as part of the flushometer, it will be appreciated that the sensor 120 may be used in a variety of other implementations. For example, the sensor 120 may be located in a wall-mounted flushometer. Alternatively, the sensor 120 may be implemented in a faucet that controls the flow of water in response to the presence (or absence) of a user. Similarly, the sensor 120 may be used in an automatic soap dispenser, an automatic hand dryer, an automatic paper towel dispenser, a hand sanitation unit (e.g., one that emits UV light), etc. The light ring assembly 130 may use a plurality of light sources (e.g. light emitting diodes (LEDs)) to convey messages and/or signals (e.g., information). The light ring assembly 130 may be a battery-operated device configured to drive a plurality of LEDs. The plurality of LEDs may generate a light that travels around the circumference of light ring assembly 130 smoothly. As will be discussed in greater detail below, the light generated by light ring assembly 130 may convey different information and/or signals to owners, maintenance, custodial staff, and/or users. The outlet connection 150 may connect flushometer 100 to a toilet and/or urinal (not shown) via a flush connection (not shown), a spud coupling (not shown), and/or a spud flange (not shown).

Figure 1B:
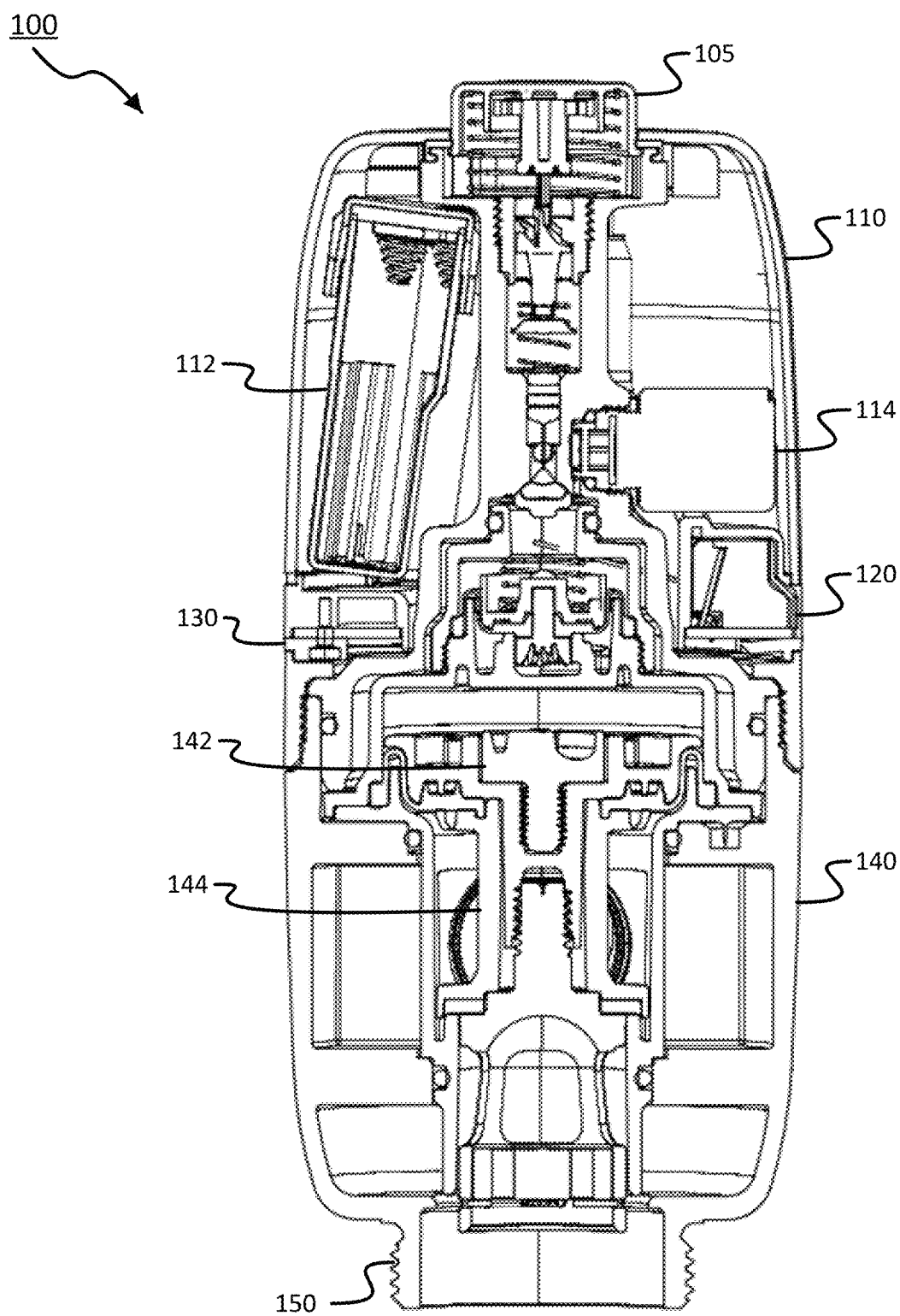

FIG. 1B shows a cross-sectional view of the flushometer 100. As discussed above, the flushometer 100 may comprise the upper housing 110, the sensor 120, the light ring assembly 130, the lower housing 140, and the outlet connection 150. The upper housing 110 may encase a power supply 112 and a solenoid 114. The power supply 112 may be any power supply capable of providing power to the sensor 120, the light ring assembly 130, and/or any additional components of the flushometer 100. In some examples, the power supply 112 may be a separate switching power supply to preserve battery life. In this regard, the power supply 112 may be a low voltage power supply (e.g., 6 volts provided by 4 AA alkaline batteries) configured to power the flushometer 100 (and its various components) for between 2-6 years. The solenoid 114 may be any suitable solenoid configured to effectuate flushing of a toilet and/or urinal. In this regard, solenoid 114 may comprise a plunger (not shown) configured to move a diaphragm and/or relief valve that initiates the flow of water through the flushing mechanism in response to receiving a signal from a sensor, such as the sensor 120. In some examples, the solenoid 114 may be a high impedance solenoid or a bi-stable solenoid. In further examples, the solenoid 114 may be a low-powered solenoid configured to consume a small amount of energy on the order of several milli-Joules (mJ) for each flush.

The flushometer 100 may also comprise a diaphragm disk 142 and/or a guide assembly 144. In this regard, water may reside in two chambers of the valve body (e.g., the upper and lower chambers). When the flushometer 100 is idle, the pressure in the upper chamber may be greater than the pressure in the lower chamber. This increased pressure keeps the diaphragm disk 142 pushed down against the valve seat, and prevents any water from flowing down into the valve. When flushing is actuated, the diaphragm disk 142 may lift (e.g., rise), which releases the pressure in the upper chamber. The pressure release in the upper chamber may cause the guide assembly 144 to lift, causing an outlet path for the water to open. As a result, the water from both chambers may flow down the valve, though the guide assembly 146, and into the toilet and/or urinal. Once the flush is initiated and water flows out of the valve, water from the supply line may begin to fill both valve chambers. As the water pressure in the upper chamber begins to build, the pressure may gradually push on the diaphragm disk 142, creating a greater force over the top side of the diaphragm disk 142 and allowing the diaphragm disk 142 to reseat back onto the valve seat. The reseating of the diaphragm disk 142 may cause the guide assembly 144 to lower. Once the diaphragm disk 142 and/or the guide assembly 144 have been lowered, the upper chamber may be sealed and the flow of water from the inlet may stop. The flushometer 100 may be ready to be flushed again.

Figure 2:
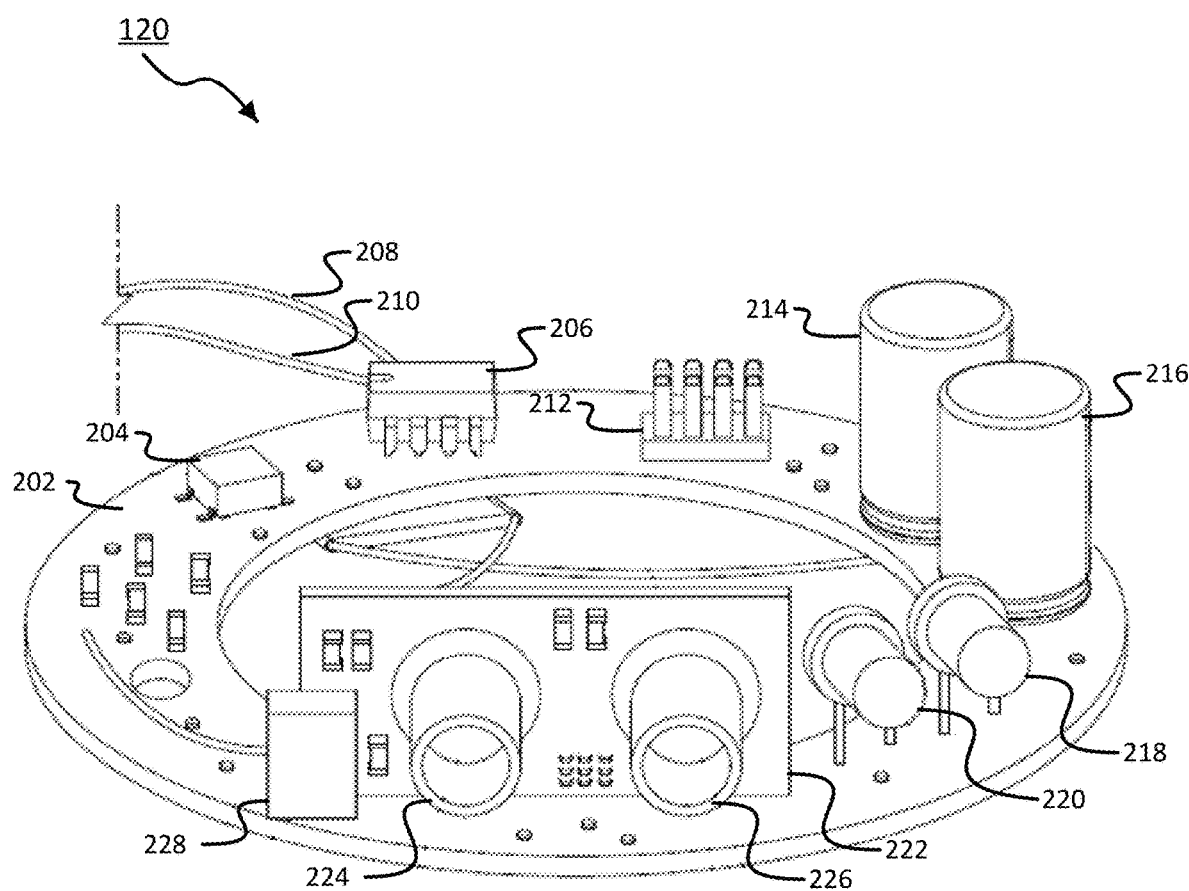
FIG. 2 shows an example of a sensor circuit board in accordance with one or more aspects of the disclosure.

FIG. 2 shows an example of a sensor 120 according to one or more aspects of the disclosure. The sensor 120 may comprise a circuit board 202 that includes a processor 204, a memory 206, a connection module 212, a first capacitor 214, a second capacitor 216, a time-of-flight (ToF) sensor 222, and/or an IR sensor comprising a first IR transmitter 218, a second IR transmitter 220, and a IR receiver 228. A data bus (not shown) may interconnect processor 204, memory 206, the first IR transmitter 218, the second IR transmitter 220, the ToF sensor 222, and/or the IR receiver 228. Additionally, a first electrical lead 208 and a second electrical lead 210 may connect circuit board 202 to a power supply, such as power supply 112. As noted above, the power supply may supply power to sensor 120 and/or any additional components, such as a flushing mechanism, a soap dispenser, a faucet, etc. In some instances, the power supply may be a low voltage power supply (e.g., 6 volts provided by 4 AA alkaline batteries) configured to power hybrid sensor 100 and/or any additional components for between 2-6 years. In other embodiments, the power supply may be a building power supply (e.g., 120 VAC, 60 Hz) via a standard electrical junction box. In these embodiments, a back-up power supply, such as the power supply 112, may be included in case the building loses power.

As shown in FIG. 2, the circuit board 202 may be annular (e.g., ring-shaped). In this regard, an annular shaped circuit board may allow for additional hardware to operate in the center opening of the circuit board 202. For example, the opening may receive an enclosed unit that includes a guide assembly and/or diaphragm. The enclosed unit may be waterproof and/or water-resistant. The guide assembly and/or diaphragm may travel within the enclosed unit, thereby allowing the toilet (or urinal) to flush. Similarly, the opening may allow the sensor 120 and/or a control module to control the operation of a faucet (i.e., turn the water on and/or off). While the circuit board 202 is shown as being annular, it will be appreciated that the circuit board 202 may be of any appropriate shape and/or size suited to perform the required functionality described herein.

The processor 204 may be any suitable processor configured to control operation of the sensor 120 and its associated components, including the memory 206, the first IR transmitter 218, the second IR transmitter 220, the ToF sensor 222, and/or the IR receiver 228. In this regard, the processor 204 may include a single central processing unit (CPU), which may be a single-core or multi-core processor, or may include multiple CPUs. Additionally or alternatively, the processor 204 may include a low-power processor and/or microcontroller, such as an Advanced RISC Machine (ARM) processor, an Atmel 8-bit AVR microcontroller, and/or any suitable field programmable array (FPGA) or application specific integrated circuit (ASIC). The processor 204 and/or the associated components described herein may allow the sensor 120 to execute a series of computer-readable instructions to perform some or all of the processes described herein.

The memory 206 may include, but is not limited to, random access memory (RAM), read only memory (ROM), electronically erasable programmable read only memory (EEPROM), flash memory, or other memory technology, optical disk storage, magnetic cassettes, magnetic tape, magnetic disk storage or other magnetic storage devices, or any other medium that may be used to store the desired information and that may be accessed by the processor 204. Software may be stored within the memory 206 to provide instructions to the processor 204 allowing the sensor 120 to perform various actions, including the processes and methods described herein. The various hardware memory units in the memory 206 may include volatile and nonvolatile, removable and non-removable media implemented in any method or technology for storage of information such as computer-readable instructions, data structures, program modules, or other data.

The connection module 212 may be any connection interface configured to communicate with one or more control modules. For example, the connection module 212 may include a plurality of pins (e.g., 4, 6, 8, 12, etc.) configured to receive a female connector from one or more control modules. In this regard, the processor 204 may communicate with the one or more control modules via the connection module 212. For instance, the processor 204 may send a signal and/or power, via the connection module 212, to a flush control module (not shown) and/or a solenoid driver. The flush control module and/or solenoid driver may receive the signal and provide a signal to a solenoid, which may cause a plunger to move to effectuate flushing of a toilet (or urinal). Similar operations may occur to turn on a faucet, turn off a faucet, dispense soap, activate a hand dryer, dispense paper towels, open an automatic door, sanitize hands using UV light, etc.

The first capacitor 214 and the second capacitor 216 may be capacitors of any suitable size. In this regard, the first capacitor 214 and/or the second capacitor 216 may be configured to regulate the voltage to the first IR transmitter 218 and/or the second IR transmitter 220. In some examples, the first capacitor 214 and/or the second capacitor 216 may be configured to store power to ensure a steady and/or smooth supply of power to one or more light sources, such as the light sources discussed below with respect to FIG. 3. Additionally, the first capacitor 214 and the second capacitor 216 may provide better power management capabilities that allow a limited power supply (e.g., 6 V provided by 4 AA alkaline batteries) to power multiple components (e.g., sensor 120, one or more control modules, etc.) for an extended period of time in the case of an emergency event, such as a power supply brown out.

The first IR transmitter 218 and the second IR transmitter 220 may be part of a proximity sensor, such as an infrared sensor. For example, the first IR transmitter 218 and/or the second IR transmitter 220 may be part of a Sloan® G2 proximity sensor. In some instances, the first IR transmitter 218 and/or the second IR transmitter 220 may be a low powered IR diode configured to emit (e.g., transmit) IR light at a steady (e.g., constant, continuous) rate. In some examples, the first IR transmitter 218 may be angled upwards, while the second IR transmitter 220 may be angled downward. For example, first IR transmitter 218 may be angled upward between 15 and 75 degrees, and second IR transmitter 220 may be angled downward at a similar angle (e.g., between 15 and 75 degrees). By angling the first IR transmitter 218 and the second IR transmitter 220 in different directions, the sensor 120 may better detect the presence and/or location of a user proximate to the sensor 120 and its relative position with respect to other non-moving (e.g., steady-state) objects within range of the sensor 120. The IR receiver 228 may be another component of the proximity sensor (e.g., the IR sensor). In this regard, the IR receiver 228 may be an IR detector configured to detect IR light transmitted by the first IR transmitter 218 and/or the second IR transmitter 220. In this regard, the IR receiver 228 may detect an object proximately located to the sensor 120 if a certain amount and/or intensity of IR light is detected. For example, if the detected light is equal to or greater than a predetermined threshold (e.g., a predetermined number of lumens), the IR receiver 228 (e.g., photodiode, phototransistor, etc.) may indicate an object proximate to the sensor 120. Additionally or alternatively, several thresholds may be used to determine how close the object is to the sensor 120. Indicating an object proximate to the sensor 120 may comprise sending (e.g., transmitting) a signal to the processor 204 indicating the presence of the object. The first IR transmitter 218, the second IR transmitter 220, and the IR receiver 228 may be collectively referred to as an IR sensor.

The ToF sensor 222 may comprise a ToF transmitter 224 and a ToF receiver 226. In this regard, the ToF transmitter 224 may be a diode configured to emit (e.g. transmit, send) a laser beam at one or more objects. For example, the ToF transmitter 224 may be a Vertical Cavity Surface-Emitting Laser (VCSEL) configured to transmit a laser at a predetermined wavelength (e.g., 940 nm). The ToF receiver 226 may be a detector configured to receive the laser beam reflected off of the one or more objects. The ToF sensor 222 may be configured to determine how far the one or more objects are from the sensor 120 using the roundtrip time from when the laser was transmitted by the ToF transmitter 224 until the reflected laser was received by the ToF receiver 226. In some examples, the ToF sensor 222 may use a SPAD (Single Photon Avalanche Diodes) array to measure distances up to several (e.g., ≥2) meters away in a short period of time (e.g., <30 ms). In operation, the ToF sensor 222 may remain inactive (e.g., dormant, sleep, power-down) because of how much energy it consumes. However, the ToF sensor 222 may be activated to calibrate the IR sensors, for example, based on the IR receiver 228 indicating an object proximate to the sensor 120. For example, the processor 204 may transmit a signal to activate the ToF sensor 222 to determine how far an object is from the sensor 120. Additionally or alternatively, the processor 204 may transmit a signal to the ToF sensor 222, based on a measurement from the IR receiver 228, that activates the ToF sensor 222, which in turn determines how far an object is from the sensor 120.

After being activated, the ToF sensor 222 may obtain one or more measurements of the object detected by the infrared sensor. As noted above, the ToF sensor 222 may emit a beam of light, for example, from the ToF transmitter 224. The ToF receiver 226 may detect the beam of light transmitted by the ToF transmitter 224 after it has been reflected off of the object. In some examples, the IR sensor may also obtain one or more measurements of the intensity of the infrared light being reflected off the object, for example, using the IR receiver 228. The one or more measurements of the intensity of the infrared light may be obtained simultaneously with the one or more measurements obtained using the ToF sensor 222.

Once the ToF sensor 222 has taken the one or more measurements, it may return to a dormant state (e.g., low power or sleep mode) while the infrared sensor may continue to emit infrared light and/or detect the reflection of the infrared light off of one or more objects. It will be appreciated that the ToF sensor 222 may require a significant amount of electrical energy to operate. Thus, returning the ToF sensor 222 to a dormant state after obtaining the one or more measurements may conserve power while obtaining the data to calibrate the IR sensor. The measurements taken by the ToF sensor 222 may be used to calibrate the IR sensor in real time.

The sensor 120, and light ring assembly 130, may be deployed in a variety of automated fixtures and/or appliances, including automatic faucets, automatic soap dispensers, automatic hand dryers, automatic paper towel dispensers, automatic doors, hand sanitation units, and the like.

Figure 3:
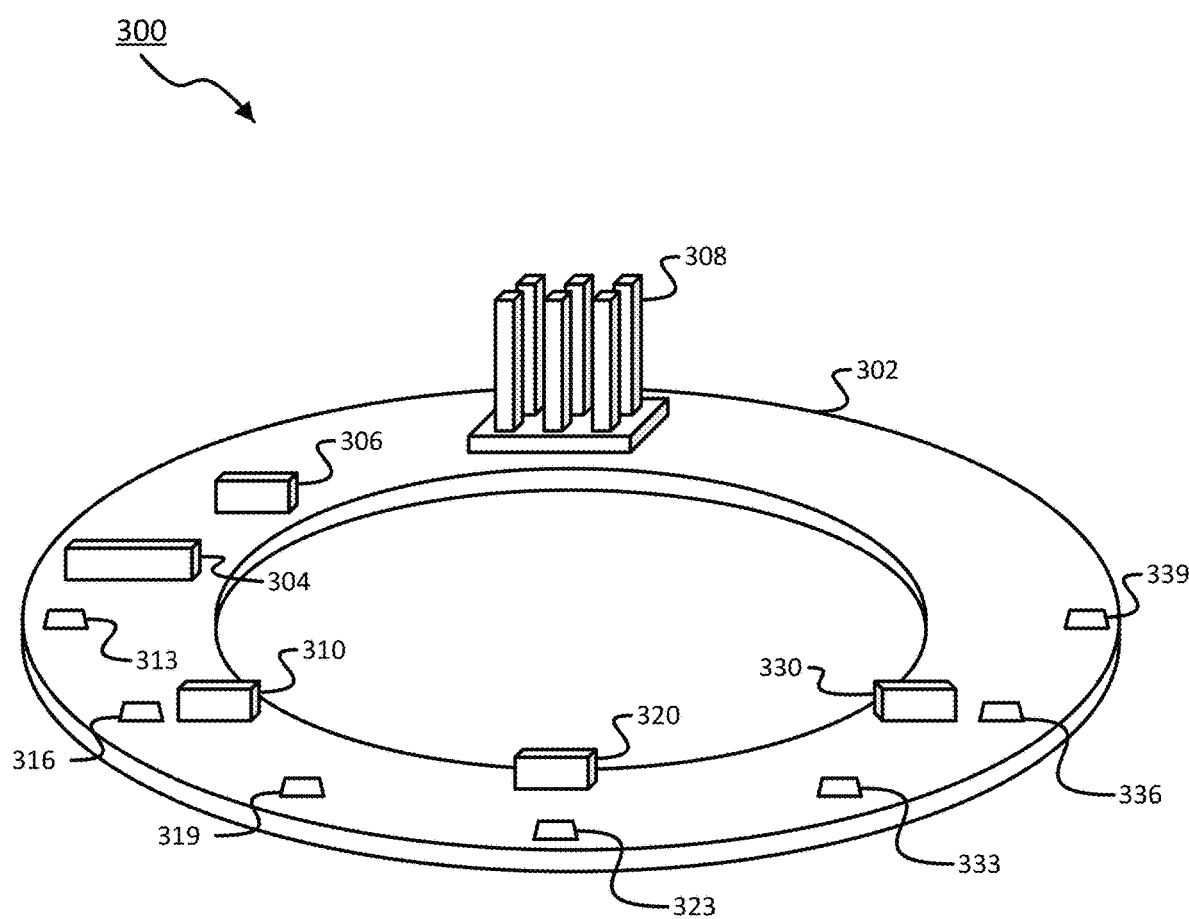
FIG. 3 shows an example of a light ring circuit board according to one or more aspects of the disclosure.

Turning to FIG. 3, a light ring circuit 300 is shown according to one or more aspects of the disclosure. The light ring circuit 300 may comprise circuit board 302 that includes processor 304, memory 306, a connection module 308, a first driver circuit 310, a second driver circuit 320, a third driver circuit 330, and a plurality of light sources (e.g., LED 1 313, LED 2 316, LED 3 319, LED 4 323, LED 5 333, LED 6 336, and LED 7 339). In some instances, the light ring circuit 300 may include one or more electrical leads (not shown) to connect to a power supply, such as power supply 112. Alternatively, the light ring circuit 300 may include a connection interface (e.g., a USB connector, micro-USB connector) (not shown) to obtain power from another source, such as the sensor 120 and, more specifically, the sensor circuit board 202.

Like the circuit board 202 described above, the circuit board 302 may be annular (e.g., ring-shaped) to allow for additional hardware (e.g., plumbing hardware) to operate in the center opening of the circuit board 302. In some instances, the circuit board 302 may be the underside of the circuit board 202. That is, the sensor circuitry may be located on one side of a circuit board, while the light ring circuitry may be located on the other. In other examples, the circuit board 302 may be a separate circuit board from that of circuit board 202. While the circuit board 302 is illustrated as being ring-shaped, it will be appreciated that the circuit board 302 may be of any appropriate shape and/or size suited to perform the required functionality described herein.

The processor 304 may be any suitable processor configured to control operation of the light ring and the plurality of light sources located thereon. Similar to the processor 204 above, the processor 304 may include a single central processing unit (CPU), which may be a single-core or multi-core processor, or may include multiple CPUs. The processor 304 may also comprise a low-power processor and/or microcontroller, such as an ARM processor, an Atmel 8-bit AVR microcontroller, and/or any suitable field programmable array (FPGA) or application specific integrated circuit (ASIC). The processor 304 and/or its associated components described herein may execute a series of computer-readable instructions to perform some or all of the processes described herein.

The memory 306 may include random access memory (RAM), read only memory (ROM), electronically erasable programmable read only memory (EEPROM), flash memory, and/or any other appropriate memory technology or any other medium that may be used to store the desired information and that may be accessed by the processor 304. Software may be stored within the memory 306 to provide instructions to the processor 304 that control the illumination and/or dimming (e.g., darkening) of the LEDs. The memory 306 may include volatile and/or nonvolatile, removable and non-removable media implemented in any method or technology for storage of information such as computer-readable instructions, data structures, program modules, or other data.

The connection module 308 may be any connection interface configured to communicate with one or more control modules, the sensor circuit board 202, and/or a power supply, such as power supply 112. In this regard, the connection module 308 may include a plurality of pins (e.g., 4, 6, 8, 12, etc.) configured to receive a female connector. Additionally or alternatively, the connection module 308 may be a female connector to receive a male connector. In some examples, the connection module 308 may be a serial connector, such as a USB connector or a micro-USB connector. In this regard, the processor 304 may receive a signal from the sensor circuit board 202 (e.g., processor 204 on circuit board 202) that indicates activation of one or more of the plurality of light sources. The signal may be received in response to the sensor 120 detecting an object, for example, based on a certain amount and/or intensity of IR light being detected. In response to receiving the signal, the processor 304 may illuminate and/or dim (e.g., darken) one or more of the plurality of light sources, as will be discussed in greater detail below with respect to FIGS. 5A-5C.

The first driver circuit 310, the second driver circuit 320, and/or the third driver circuit 330 may be any electrical circuit configured to power one or more of the plurality of light sources. The first driver circuit 310, the second driver circuit 320, and/or the third driver circuit 330 may supply sufficient current to illuminate the light sources to a defined brightness, while limiting the current to prevent damaging the light sources. As noted above, each of the plurality of light sources (e.g., LED 1 313, LED 2 316, LED 3 319, LED 4 323, LED 5 333, LED 6 336, and LED 7 339) may be a light emitting diode (LED). The light sources may be positioned at specific locations along the outer edge of the circuit board 302. For example, the light sources may be separated by a predetermined amount of space to help maximize light intensity and/or distribution, while allowing for the smooth transition of light from one LED to another in a way that avoids visual hotspots. Each of the plurality of light sources (e.g., LEDs) may comprise a radiation angle. The radiation angle may be between 105 and 130 degrees and, preferably, is 120 degrees. The light sources may be either tricolor LEDs or monochrome LEDs. The tricolor LEDs may be used to generate a plurality of colors that may be used to signal and/or message owners, maintenance, custodial staff, and/or users. While seven light sources are shown along the outer edge of the circuit board 302, it will be appreciated that more, or fewer light sources may be used. In some examples, the plurality of light sources may comprise thirteen light sources (e.g. LEDs). Further, it will be appreciated that the light sources may extend along the entire outer edge of circuit board 302, instead of only half of the outer edge as shown in FIG. 3. Additionally or alternatively, the light sources may be placed along a portion (e.g., less than half) of the outer edge of the circuit board 302.

In operation, each of the driver circuits may control a predetermined number of light sources. For example, first driver circuit 310 may control LED 1 313, LED 2 316, and LED 3 319; the second driver circuit 320 may control LED 4 323; and the third driver circuit 330 may control LED 5 333, LED 6 336, and LED 7 339. Thus, one driver circuit may drive (e.g., illuminate, control) up to three LEDs. Alternatively, a single driver may drive (e.g., illuminate, control) up to eight LEDs. The use of driver circuits allows for the accurate illumination (and darkening) of the LEDs. Additionally, driver circuits may provide better color accuracy and/or intensity, while conserving power by driving the LEDs using various power management techniques.

The light ring circuit 300 may be part of a light ring assembly that includes the light sources and the circuitry and/or logic for driving those light sources. However, the light ring assembly may include a plurality of components that allow the light ring to be implemented in a variety of fixtures and/or appliances. FIG. 4 illustrates an example of a light ring assembly 130 according to one or more aspects of the disclosure.

Light ring assembly may comprise the circuit board 302 and a light pipe 410. The light pipe 410 may connect to the underside of the sensor 120 to form a water proof and/or water-resistant seal. In this regard, the circuit board 302 and/or light pipe 420 may comprise hardware configured to connect the light ring assembly 130 to a sensor (e.g., sensor 120) and/or the housing of the flushometer (e.g., the upper housing 110 and the lower housing 140). As discussed above, the light ring circuit 300 may be integral to sensor 120 or, alternatively, light ring circuit 300 may be attached to sensor 120. In these examples, the light pipe 410 may be configured to enclose some, or all, of sensor 120 in addition to enclosing the light ring circuit 300. In some examples, the light ring assembly 130 may sit on a second housing, such as a hydraulic valve body (not shown). In some embodiments, the light pipe 410 may be made of a water proof and/or water-resistant material, such as plastic. In some embodiments, the circuit board 302 and the light pipe 410 may be ring-shaped to provide space for additional hardware (e.g., plumbing hardware).

The light pipe 410 may be a lens connected to a circumference of the circuit board 302. The light pipe 410 may comprise a transmission path for the light generated by one or more light sources and an exterior edge. The light pipe 410 may comprise a phosphor, a doped plastic, and/or any other suitable diffusive material, configured to diffuse light produced by the plurality of light sources located on the circuit board 302. As shown in FIG. 4, the circuit board 302 comprises an LED 413. It will be appreciated that the circuit board 302 may comprise a plurality of light sources (e.g., LED 1 313, LED 2 316, LED 3 319, LED 4 323, LED 5 333, LED 6 336, and LED 7 339), and the LED 413 is merely illustrative. The light pipe 410 may be configured to diffuse the light emitted from the plurality of light sources. Each of the plurality of light sources (e.g., LED 1 313, LED 2 316, LED 3 319, LED 4 323, LED 5 333, LED 6 336, and LED 7 339) may be configured to emit light at a specific angle (e.g., radiation angle). The angle may be between 105 and 130 degrees from a viewing angle (e.g., user perspective). Preferably, the radiation angle is 120 degrees from the viewing angle. Additionally, the light pipe 410 may be a predetermined thickness (e.g. between 3 mm and 50 mm, and preferably between 3 mm and 15 mm) to achieve uniform light distribution and/or intensity in the vertical direction to ensure good human visibility and avoid visual hotspots. The light pipe 410 may comprise a specific geometry to ensure that the light assembly 130 may be sealed to the circuit board 302 to ensure water resistance while maintaining an air gap between the light sources and the light pipe 410. The air gap may cool the light sources and/or allow the light sources to radiate heat. This may extend the life of the light sources by preventing them from overheating and/or burning out.

The light pipe 410 may be configured to bend the light produced by the plurality of light sources (e.g., LED 1 313, LED 2 316, LED 3 319, LED 4 323, LED 5 333, LED 6 336, and LED 7 339) and deliver the light to an exterior surface of the light pipe 410. In some instances, the light pipe 410 may comprise a reflective material configured to reflect light from the plurality of light sources to an edge surface of the light pipe 410. In addition to emitting light directly emitted by the plurality of light sources, the light pipe 410 may bend the light generated by the plurality of light sources a predetermined angle. In preferred embodiments, the predetermined angle is 90 degrees. In some examples, the light pipe 410 may comprise a diffusive component (e.g., material) of a predetermined concentration to diffuse light from each of the plurality of light sources.

Figure 5A:
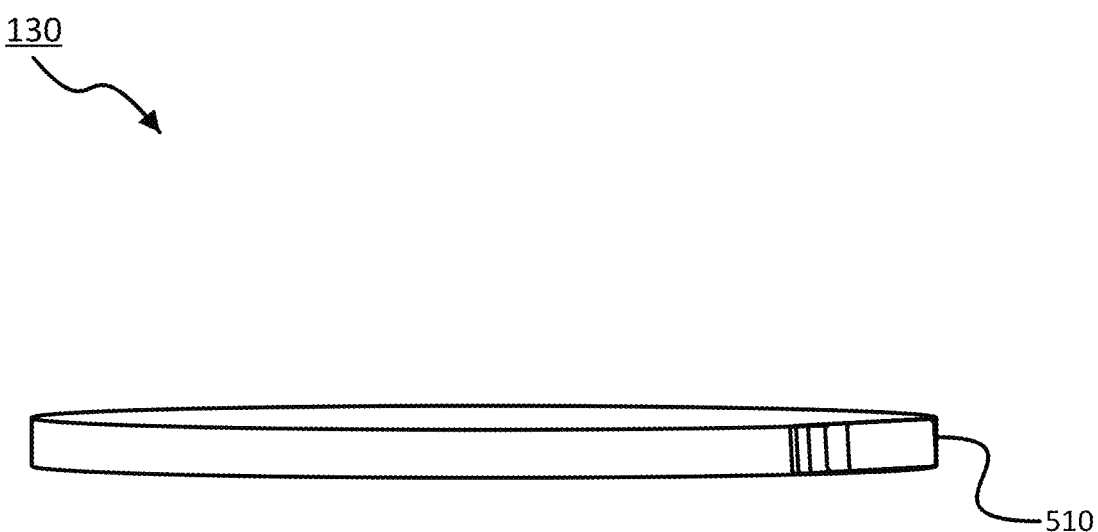
FIGS. 5A-5C show an example of a light pattern according to one or more aspects of the disclosure.
Figure 5B:
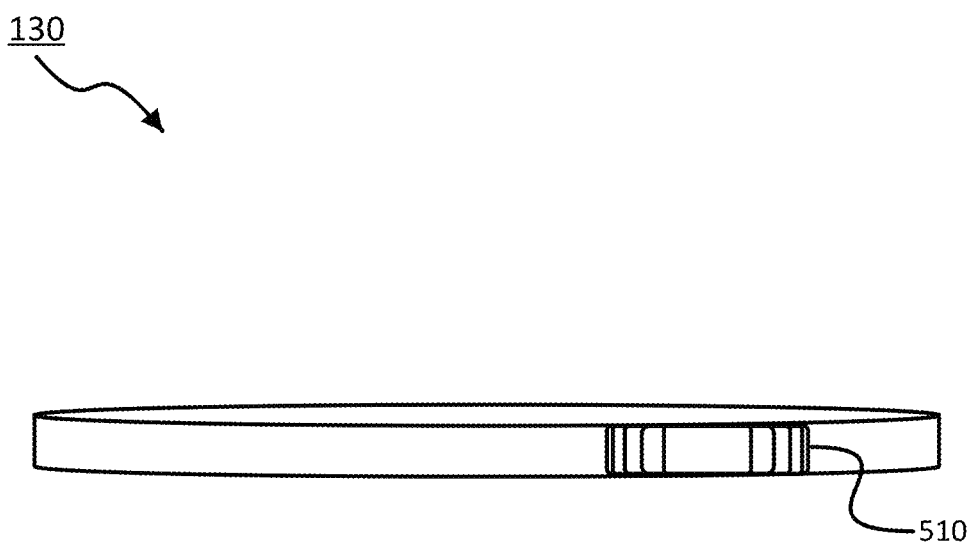
Figure 5C:
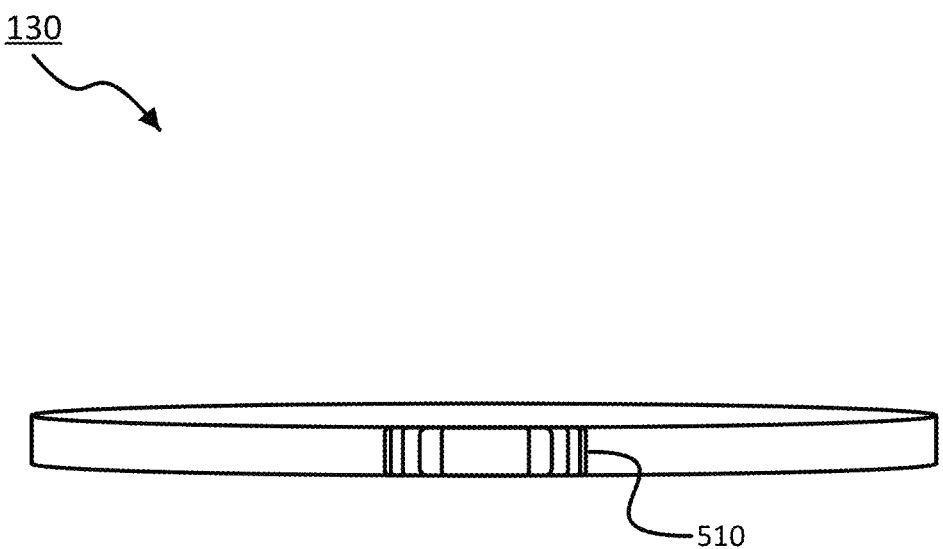

As noted above, the light ring described herein may be configured to generate one or more light patterns on a radiating surface, such as an outer edge of light pipe 410. FIGS. 5A-5C show an example of a light pattern according to one or more aspects of the disclosure.

FIG. 5A shows the light ring assembly 130 generating a pulse 510. Pulse 510 may have a smooth illumination and decay of light intensity on the radiating surface. As shown in FIG. 5A, the pulse 510 may be initially generated at an outer edge of light assembly 130. By controlling the plurality of light sources in light assembly 130, the light assembly 130 may generate a smooth and/or uninterrupted pulse 510 that traverses the circumference of light ring assembly 130. As will be discussed in greater detail below with respect to FIG. 6, the travelling pulse 510 may be achieved by modulating the intensity and/or timing of adjacent light sources such that the peak of pulse 510 moves around the circumference of light assembly 130 at a predetermined velocity. FIG. 5B illustrates an example of the pulse 510 moving away from the edge of the light ring assembly 130 toward the center of the outer edge of the light pipe 410. FIG. 5C illustrates another example of the pulse 510 traveling towards an edge of the light ring assembly. While FIGS. 5A-5C illustrate the pulse 510 traversing the circumference of the light ring assembly 130, it will be appreciated that different signals and/or messages may be generated through the control of adjacent light sources. For example, a pulse traveling from border to border (e.g., edge-to-edge) may be an acknowledgement that the sensor (e.g., sensor 120) has detected a user. Additionally or alternatively, a pulse may increase in speed, for example, to indicate a countdown until a flush. In some examples, the pulse may be generated to indicate activation of a solenoid, such as solenoid 114 discussed above. The different signals and/or messages generated by light ring assembly 130 may convey different information and/or signals to owners, maintenance, custodial staff, and/or users to provide a better user experience.

Figure 6:
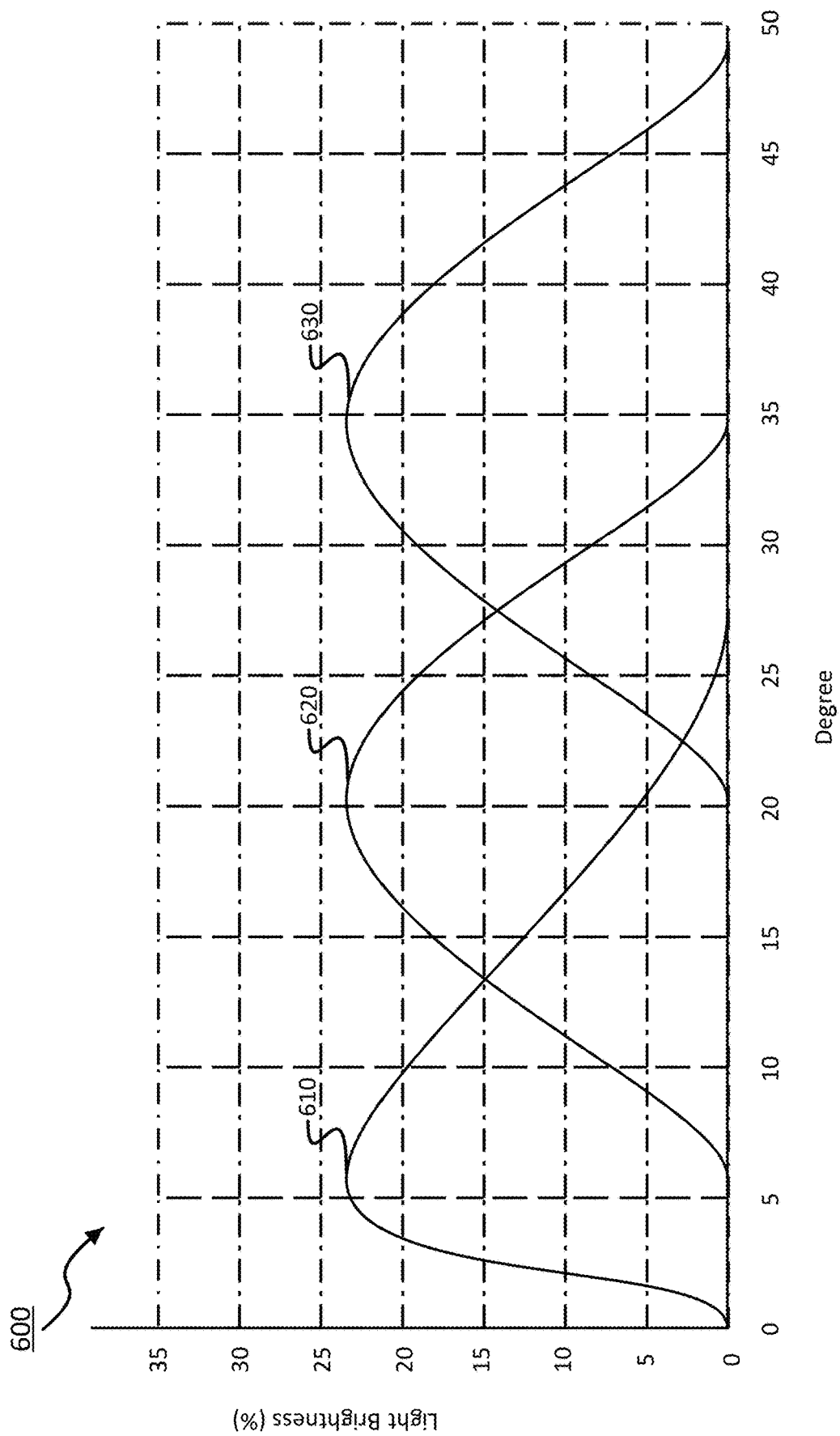
FIG. 6 shows a graph for illuminating each of a plurality of light sources to generate a smooth and uninterrupted pulse that travels around a circumference of a light ring according to one or more aspects of the disclosure.

To generate the different signals and/or messages, the plurality of light sources may be illuminated in different sequences and/or patterns. FIG. 6 shows a graph 600 for illuminating each of the plurality of light sources to generate a smooth and/or uninterrupted pulse that travels around the circumference of the light ring assembly 130.

The X-axis of graph 600 illustrates a radiation degree for the light sources on the lens of the light assembly, while the Y-axis shows a light brightness (e.g., in percentage) for each of the light sources. The first line 610 may represent an illumination of an initial light source as a first step in generating the travelling pulse of light. As shown by the first line 610 in FIG. 6, a first light source, such as LED 1 313, LED 7 339, or both, may be illuminated to a maximum brightness (e.g., ~23% brightness) over a short period of time. Once the first light source has achieved maximum brightness, a controller (e.g., processor 304, a driver circuit, or a combination thereof) may begin illuminating a second light source (e.g., LED 2 316, LED 6 336, or both) according to a second line 620. Similarly, the first light source may begin darkening (e.g., decaying), for example, based on or in response to the second light source being illuminated. When the second light source has reached the desired degree of brightness, a controller (e.g., processor 304, a driver circuit, or a combination thereof) may begin illuminating a third light source (e.g., LED 3 319, LED 5 333, or both) according to a third line 630. Much like the first light source, the second light source may begin darkening (e.g., decaying) based on the third light source being illuminated. By illuminating adjacent light sources in a predetermined, overlapping sequence as illustrated in FIG. 6, the pulse (e.g., distribution of light) may realize a uniform light intensity on the radiating surface in an intended angular direction (e.g., 120 degrees included from front perspective). The sequencing and/or overlapping of adjacent light sources may also help avoid and/or reduce visual hotspots, thereby creating a better overall user experience.

It will be appreciated that the apparatuses, methods, processes, and techniques described above may conserve resources by more effectively determining the location and/or actions of a person. For example, the sensors described herein may conserve water at toilets and urinals by modulating the type of flush based on the user's detected position and/or actions. Similarly, paper towels may be distributed more equitably, hand dryers may more turn on and off more reliably, and a variety of other savings may be realized.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although certain specific aspects of various example embodiments have been described, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. Thus, embodiments disclosed should be considered in all respects as examples and not restrictive. Accordingly, the scope of the inventions herein should be determined not by the embodiments illustrated, but by the appended claims and their equivalents.

The invention claimed is:

1. A system comprising:
   a sensor configured to detect an object in proximity to a sensor;
   a light ring assembly comprising:
      an annular circuit board comprising:
         at least one light emitting diode (LED) driver circuit;
         a plurality of LEDs arranged on the annular circuit board equidistant from each other;
         a controller configured to illuminate, via the at least one LED driver circuit, one or more of the plurality of LEDs based on the sensor detecting the object in proximity to the sensor; and
         a memory configured to store instructions for illuminating the plurality of LEDs, wherein the instructions are configured to illuminate the plurality of LEDs to convey one or more messages; and
      a light pipe connected to a circumference of the annular circuit board, wherein the light pipe is configured to:
         bend the light produced by the plurality of LEDs for delivery to an edge of the light pipe; and
         diffuse light produced by the plurality of LEDs.

2. The system of claim 1, wherein the plurality of LEDs are arranged on one half of the annular circuit board.

3. The system of claim 1, wherein the light pipe is configured to bend the light produced by the plurality of LEDs 90 degrees.

4. The system of claim 1, further comprising:
   a flushing mechanism configured to effectuate a flushing operation of a fixture based on the object's detected position or actions.

5. The system of claim 1, further comprising:
   a soap dispenser configured to dispense soap in response to the sensor detecting the object in proximity to the sensor.

6. The system of claim 1, further comprising:
a faucet configured to start a flow of water in response to the sensor detecting the object in proximity to the sensor.

7. The system of claim 6, wherein the faucet is configured to stop the flow of water in response to the sensor no longer detecting the object in proximity to the sensor.

8. The system of claim 1, further comprising:
a hand dryer configured to commence a flow of hot air in response to the sensor detecting the object in proximity to the sensor.

9. The system of claim 1, further comprising:
a paper towel dispenser configured to dispense a paper towel in response to the sensor detecting the object in proximity to the sensor.

10. The system of claim 1, wherein the one or more messages are conveyed by illuminating each of the plurality of LEDs in a predetermined sequence.

11. The system of claim 1, wherein the light ring assembly further comprises:
a first waterproof housing, wherein the annular circuit board is mounted to the first waterproof housing.

12. The system of claim 1, wherein each of the plurality of LEDs comprises a radiation angle between 105-130 degrees from a viewing perspective.

13. The system of claim 12, wherein the radiation angle is 120 degrees.

14. The system of claim 1, wherein the light pipe comprises a diffusive component of a certain concentration to diffuse light from each of the plurality of LEDs evenly.

15. The system of claim 1, wherein conveying a first message, of the one or more messages, comprises:
illuminating a first LED of the plurality of LEDs;
illuminating, based on the first LED reaching a defined brightness, a second LED of the plurality of LEDs, wherein the second LED is gradually illuminated in an overlapping manner with the first LED;
decaying the illumination of the first LED in response to illuminating the second LED;
illuminating, based on the second LED reaching the defined brightness, a third LED of the plurality of LEDs, wherein the third LED is gradually illuminated in an overlapping manner with the second LED; and
decaying the illumination of the second LED in response to illuminating the third LED.

16. A light ring assembly comprising:
a circuit board comprising:
at least one light emitting diode (LED) driver circuit;
a plurality of LEDs arranged on the circuit board equidistant from each other;
a controller configured to illuminate, via the at least one LED driver circuit, one or more of the plurality of LEDs in response to a signal received from a sensor that is configured to detect objects proximate to the sensor; and
a memory configured to store instructions for illuminating the plurality of LEDs, wherein the instructions are configured to illuminate the plurality of LEDs to convey one or more messages; and
a light pipe connected to a circumference of the circuit board, wherein the light pipe is configured to:
bend the light produced by the plurality of LEDs for delivery to an edge of the light pipe; and
diffuse light produced by the plurality of LEDs.

17. The light ring assembly of claim 16, wherein the circuit board is annular.

18. The light ring assembly of claim 16, wherein the light pipe is configured to bend the light produced by the plurality of LEDs 90 degrees.

19. The light ring assembly of claim 16, wherein each of the plurality of LEDs comprises a radiation angle between 105-130 degrees from a viewing perspective.

* * * * *